US009820206B2

(12) United States Patent
Abraham et al.

(10) Patent No.: US 9,820,206 B2
(45) Date of Patent: Nov. 14, 2017

(54) CELL RESELECTION METHOD AND USER EQUIPMENT THEREFOR

(71) Applicant: LG ELECTRONICS INC., Seoul (KR)

(72) Inventors: Aby Kanneath Abraham, Seoul (KR); Sunghoon Jung, Seoul (KR); Harikrishnan Jayachandran, Seoul (KR); Naveen Kumar Mandepudi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/770,687

(22) PCT Filed: Mar. 4, 2014

(86) PCT No.: PCT/KR2014/001753
§ 371 (c)(1),
(2) Date: Aug. 26, 2015

(87) PCT Pub. No.: WO2014/137127
PCT Pub. Date: Sep. 12, 2014

(65) Prior Publication Data
US 2016/0007260 A1    Jan. 7, 2016

(30) Foreign Application Priority Data

Mar. 4, 2013 (IN) .............................. 937/CHE/2013

(51) Int. Cl.
*H04W 80/04* (2009.01)
*H04W 36/24* (2009.01)
(Continued)

(52) U.S. Cl.
CPC ..... *H04W 36/245* (2013.01); *H04W 36/0083* (2013.01); *H04W 72/10* (2013.01); *H04W 76/046* (2013.01)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS 8,229,432 B2 *    7/2012    Fox ....................... H04W 36/04
                                                    455/435.2
8,265,618 B2 *    9/2012    MacNaughtan ...... H04W 24/02
                                                    455/422.1
(Continued)

FOREIGN PATENT DOCUMENTS

KR         10-0703365 B1      4/2007
KR    10-2012-0137417 A      12/2012
(Continued)

*Primary Examiner* — Hassan Phillips
*Assistant Examiner* — Prenell Jones
(74) *Attorney, Agent, or Firm* — Birch, Stewart, Kolasch & Birch, LLP

(57) ABSTRACT

Provided according to one embodiment of the present specification is a cell reselection method for reducing ping-pong phenomena. The cell reselection method may comprise the steps of: receiving information on ping-pong detection standards; determining the occurrence of ping-pong caused by the repetition of cell reselection between a first cell and a second cell on the basis of the information on ping-pong detection standards; and adjusting the priority of either cell according to the result of the determination.

17 Claims, 10 Drawing Sheets

(51) Int. Cl.
    *H04W 36/00*     (2009.01)
    *H04W 72/10*     (2009.01)
    *H04W 76/04*     (2009.01)

(56) References Cited

U.S. PATENT DOCUMENTS

| | | | |
|---|---|---|---|
| 9,049,698 B2 * | 6/2015 | Johansson | H04W 76/027 |
| 2006/0258386 A1 | 11/2006 | Jeong et al. | |
| 2010/0240368 A1 * | 9/2010 | Fox | H04W 36/04 |
| | | | 455/435.3 |
| 2013/0183974 A1 * | 7/2013 | Johansson | H04W 76/027 |
| | | | 455/436 |

FOREIGN PATENT DOCUMENTS

| | | |
|---|---|---|
| WO | WO 2008/157573 A1 | 12/2008 |
| WO | WO 2012/174440 A1 | 12/2012 |
| WO | WO 2013/020649 A | 2/2013 |

* cited by examiner

CELL RESELECTION METHOD AND USER EQUIPMENT THEREFOR

BACKGROUND OF THE INVENTION

Field of the Invention

The present invention relates to wireless communication and, more particularly, to a cell reselection method and a user equipment using the method.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Meanwhile, in the 3GPP system, handover refers to the process of transferring a user equipment in communication in a current cell to another cell, and cell reselection refers to the process of transferring a user equipment in idle state in a current cell to another cell.

However, depending on situations, cell reselection may be repeated with a very short period. For example, handover of a user equipment may take place back and forth (ping-pong) between two cells. Many attempts have been made to avoid the ping-pong phenomenon. However, since the cell reselection process of a user equipment in idle state starts by measuring a cell, a lot of previous attempts failed to completely solve the ping-pong phenomenon.

SUMMARY OF THE INVENTION

The present invention has been made in an attempt to prevent a ping-pong phenomenon.

To achieve the objective above, according to one embodiment of the present invention, there is provided a cell reselection method. The method may comprise: receiving information about a ping-pong detection criterion; determining whether a ping-pang phenomenon is occurred due to repetition of cell reselection between a first and a second cell based on the information about a ping-pong detection criterion; and adjusting priority of one of the cells according to the determination result.

The method may further comprise: receiving information about priority between a first and a second cell.

The information about a ping-pong detection criterion may include information about a ping-pong related timer and a ping-pong related counter.

The determining whether a ping-pong phenomenon is occurred comprises activating the ping-pong related timer; and determining according to the information about priority whether the number of repetitions of cell reselection between a first and a second cell reaches the ping-pong related counter before the ping-pong related timer expires.

The information about priority includes information about inter-RAT (Radio Access Technology) priority and inter-frequency priority.

The information about a ping-pong related timer and a ping-pong related counter may be received through Radio Resource Control (RRC) signaling or system information.

The adjusting step of the priority may comprise applying a compensation factor to the priority of the second cell corresponding to a neighboring cell in case it is found from the received information about priority that priority of the second cell corresponding to the neighboring cell is higher than that of the first cell corresponding to a serving cell.

The compensation factor takes on a value identical to a difference between priority of the first cell and priority of the second cell.

The adjusting step of the priority may include decreasing priority of the second cell corresponding to a neighboring cell by one step in case it is found from the received information about priority that priority of the second cell corresponding to the neighboring cell is higher than that of the first cell corresponding to a serving cell.

The adjusting step of priority may include decreasing priority of the second cell corresponding to a neighboring cell by one step in case it is found from the received information about priority that priority of the first cell corresponding to a serving cell is the same as that of the second cell corresponding to the neighboring cell.

To achieve the objective above, according to one embodiment of the present invention, there is provided a user equipment carrying out cell reselection. The method may comprise: an Radio Frequency (RF) unit configured to receive information about a ping-pong detection criterion; and a processor configured to determine whether a ping-pong phenomenon is occurred due to repetition of cell reselection between a first and a second cell based on the information about a ping-pong detection criterion and to adjust priority of one of the cells according to the determination result.

Advantageous Effects of the Invention

According to one aspect of the present invention, a ping-pong phenomenon, where cell-reselection is repeatedly performed between two cells, can be avoided.

DESCRIPTION OF EXEMPLARY EMBODIMENTS

Figure 1:
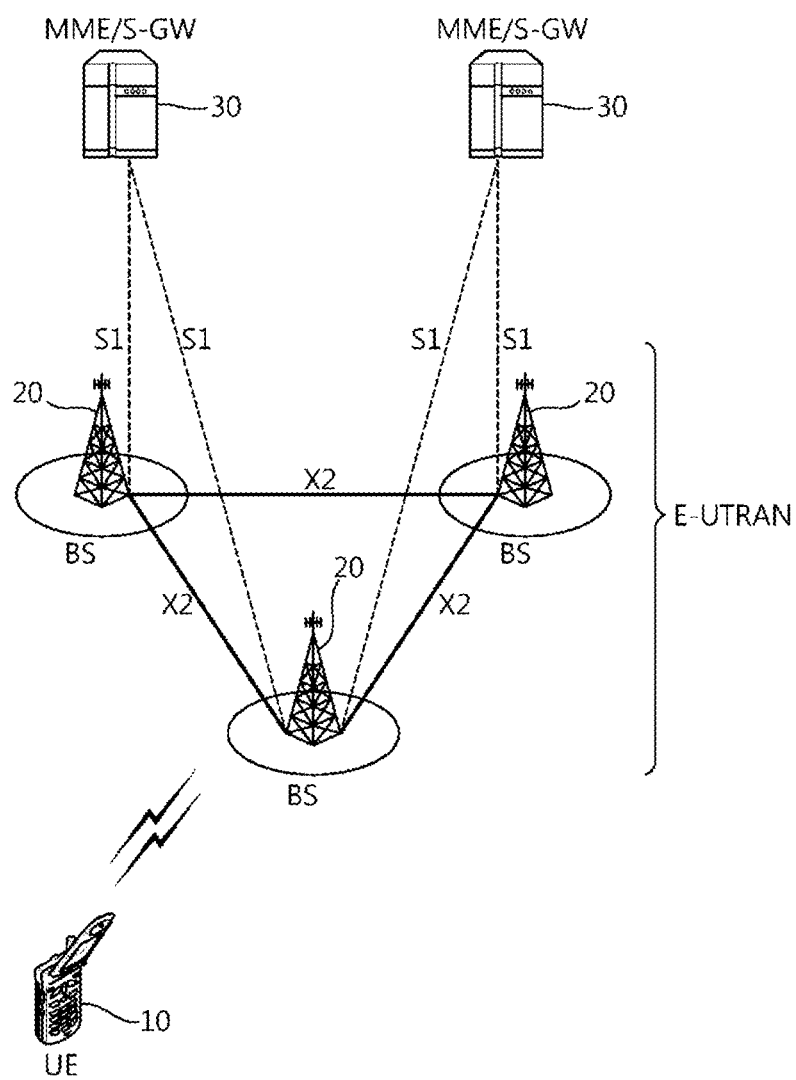
FIG. 1 illustrates a wireless communication system to which the present invention is applied.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In what follows, though a terminal is disclosed, the terminal may be called a User Equipment (UE), Mobile Equipment (ME), Mobile Station (MS), User Terminal (UT), Subscriber Station (SS), wireless device, handheld device, or Access Terminal (AT). Also, the terminal can be a portable device equipped with a communication function, such as a mobile phone, PDA, smart phone, wireless modem, or notebook. At the same time, the terminal can be an immovable device such as a PC or a vehicle-mounted device.

FIG. 1 illustrates a wireless communication system to which the present invention is applied.

The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
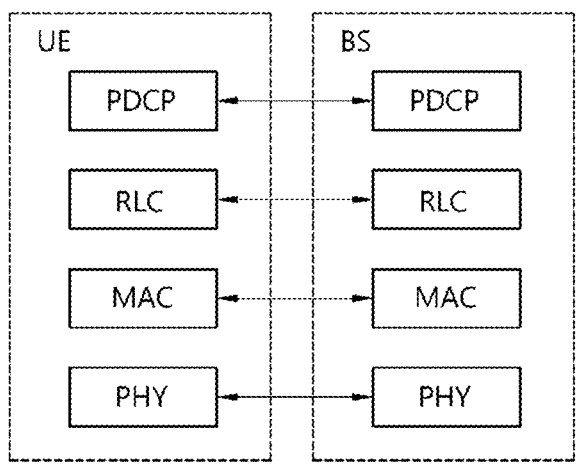
FIG. 2 is a block diagram illustrating a radio protocol architecture for a user plane.
Figure 3:
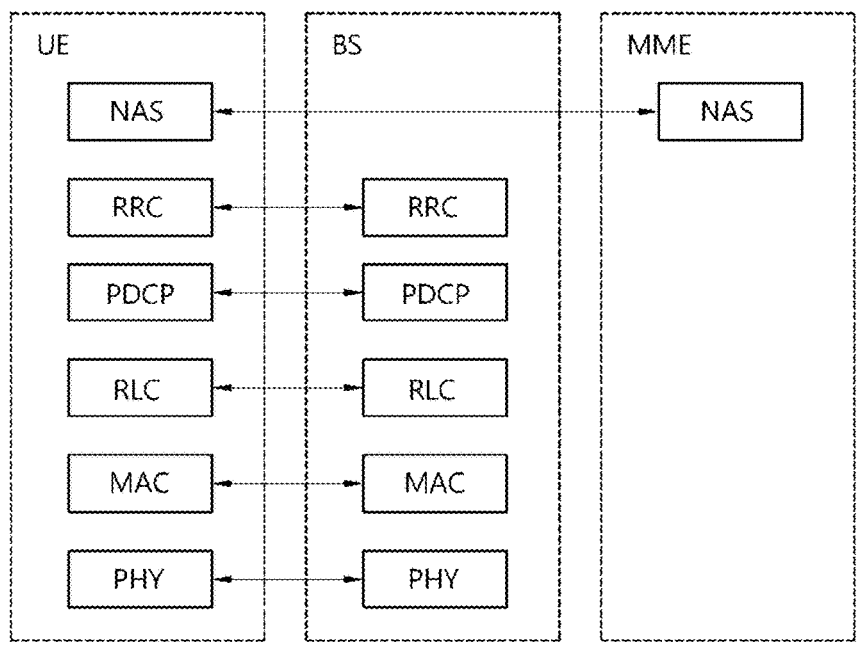
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane.

The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Now, measurement and a measurement report are described below.

In a mobile communication system, to support the mobility of UE is essential. Accordingly, the UE continues to measure the quality of a serving cell from which the UE is now provided with service and the quality of a neighbouring cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighbouring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighbouring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

In what follows, with reference to the 3GPP TS 36.304 V8.8.0 (2009-12) "User Equipment (UE) procedures in idle mode (Release 8)", a procedure for a UE to select a cell will be described in detail.

Figure 4:
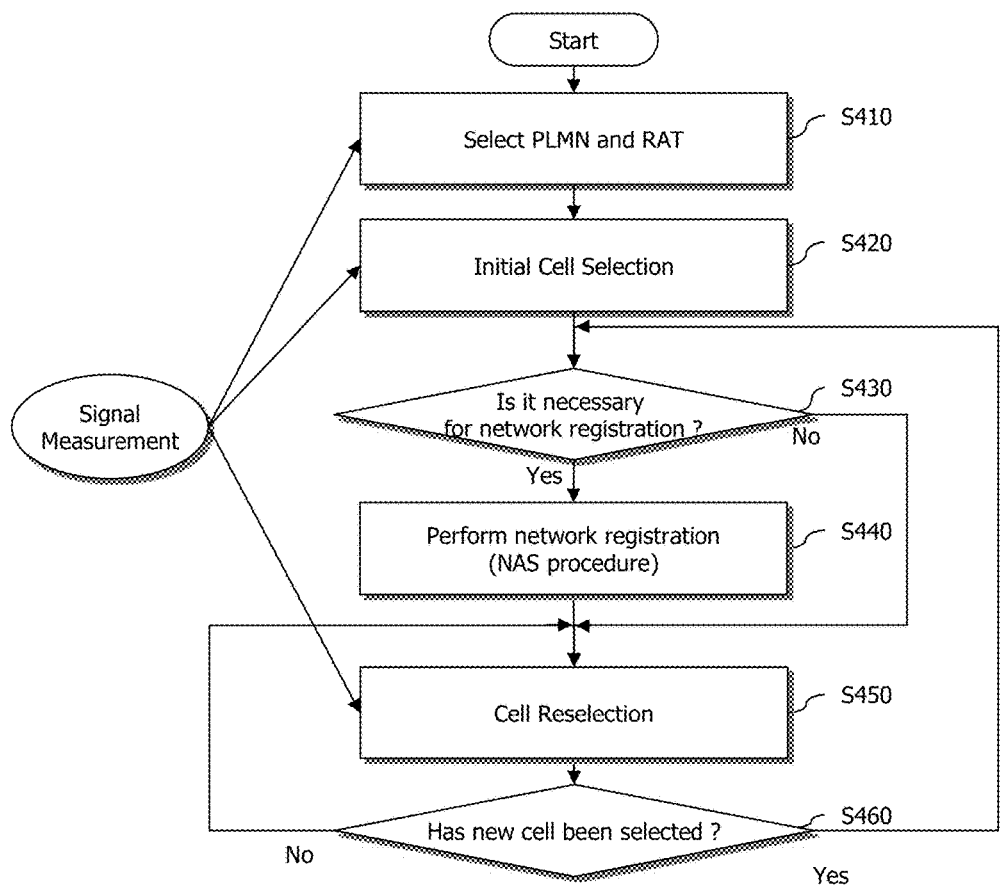
FIG. 4 is a flowchart illustrating the operation of a user equipment in the RRC idle state.

FIG. 4 is a flowchart illustrating the operation of a user equipment in the RRC idle state.

FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS.

In the cell selection process above, the UE uses the following equation as a cell selection criterion.

$$S_{rxlev} > 0$$

$$S_{qual} > 0$$

$$S_{rxlev} = Q_{rxlevmeas} - (Q_{rxlevmin} + Q_{rxlevminoffset}) - P_{compensation}$$

$$S_{qual} = Q_{qualmeas} - (Q_{qualmin} + Q_{qualminoffset}) \quad \text{[Eq. 1]}$$

The $S_{rxlev}$ value in the LTE system is calculated based on the Reference Signal Received Power (RSRP), and that in the UMTS is calculated as the Received Signal Code Power (RSCP). Also, the $S_{qual}$ value in the LTE system is calculated based on the Reference Signal Received Quality (RSRQ), and that in the UMTS is calculated as Ec/No, which represents the received power (Ec) per chip of a pilot channel divided by the overall noise power density (No).

More specifically, in the LTE system, $S_{rxlev}$ represents cell selection received (RX) level (dB), $Q_{rxlevmeas}$ the minimum required received level (dBm), $Q_{rxlevminoffset}$ the offset with respect to $Q_{rxlevmeas}$, $P_{compensation} = \max(P_{EMAX} - P_{UMAX}, 0)$ (dB), $P_{EMAX}$ the maximum transmission power (dBm) that is allowed for a UE in the corresponding cell, and $P_{UMAX}$ the maximum transmission power (dBm) of a UE's Radio Frequency (RF) unit according to the UE's performance. Also, in the LTE system, the $S_{qual}$ represents a cell selection quality value (dB), $Q_{qualmeas}$ RSRQ, $Q_{qualmin}$ the minimum quality level (dB) required within a cell, and $Q_{qualminoffset}$ the offset with respect to $Q_{qualmin}$.

One can see from Eq. 1 that the UE selects such a cell of which the measured signal strength and quality are better than particular values determined by the cell currently providing services. Also, those parameters used in Eq. 1 are broadcast through system information, and the UE receives the parameters to use them as cell selection criteria.

In case network registration is needed, the UE performs a network registration procedure S440. The UE registers its own information (for example, IMSI) to receive a service (for example, paging) from the network. The UE does not register to the network each time it selects a cell; registration is carried out when the network information received from the system information (for example, Tracking Area Identity (TAI)) is different from the information known to the UE.

The UE performs cell reselection based on the service environment or UE's environment that the cell provides S450.

For example, if the signal strength or quality measured with respect to a cell to which the UE is currently connected is lower than that measured from the base station of a neighboring cell, the UE reselects one of the other cells providing better signal quality than the current cell to which the UE is connected. This process is called cell re-selection to distinguish it from the initial cell selection. Also, after the UE selects a certain cell anyhow through the cell selection process, signal strength or quality between the UE and the base station may change due to the movement of the UE or change of a radio environment. Therefore, in case the quality of a selected cell is degraded, the UE may reselect another cell which provides better signal quality. If cell reselection is carried out as described above, the UE usually reselects a cell which provides better signal quality than the cell to which the UE is currently connected. At this time, to prevent frequent reselection of cells due to change of signal characteristics, temporal constraints are applied. A procedure for cell reselection will be described in detail later.

As described above, a cell selection or reselection method can be used adaptively according to signal characteristics of a radio environment; at the time of cell reselection, there can be a few cell reselection methods available according to RAT and frequency characteristics of a cell as follows.

Inter-RAT cell reselection: UE reselects a cell which uses RAT different from that of a current cell on which the UE is camping.

Intra-frequency cell reselection: UE reselects a cell which uses the same RAT and center-frequency as those of the cell in which the UE is camping.

Inter-frequency cell reselection: UE reselects a cell which uses the same RAT as that of a current cell in which the UE is camping but uses different RAT from that of the current cell.

First of all, the inter-RAT cell reselection and the intra-frequency cell reselection are based on the order of priority. The network can provide inter-RAT priority and frequency priority commonly to the UEs within a cell through broadcast signaling or separately to individual UEs through dedicated signaling.

If the aforementioned priority order is used and a neighboring cell satisfies Eq. 1, which uses RAT and frequency of a higher priority than the serving cell, the UE reselects the neighboring cell.

However, if the serving cell and the neighboring cell have the same priority, the cell reselection is carried out based on ranking. Also, intra-frequency cell reselection is based on the ranking. Ranking is the process that defines an index value for evaluating cell reselection and arranges cells according to the sizes of their index values. Often, the cell exhibiting the best index value is called the best ranked cell. The cell index value is obtained by applying a frequency offset or a cell offset (depending on the needs) to a value that the UE measures with respect to the corresponding cell.

In what follows, the ranking is described. Ranking criterion is defined by Eq. 2 as follows.

$$Rs = Q\text{meas},s + Q\text{hyst}, \quad Rn = Q\text{meas},n - Q\text{offset}, \quad \text{[Eq. 2]}$$

where $R_S$ represents the ranking index of a serving cell, $R_n$ the ranking index of a neighboring cell, $Q_{meas,s}$ the quality value measured with respect to the serving cell, $Q_{meas,n}$ the quality value measured with respect to the neighboring cell, $Q_{hyst}$ the hysteresis value for ranking, and $Q_{offset}$ the offset between the two cells.

In the case of intra-frequency cell reselection, if the UE receives the offset between the serving cell and the neighboring cell, $Q_{offsets,n}$, $Q_{offset} = Q_{offsets,n}$. If the UE does not receive $Q_{offsets,n}$, $Q_{offset} = 0$.

If the ranking index of the serving cell, $R_S$ and the ranking index of the neighboring cell, $R_n$ change while they remain similar to each other, the ranking order varies too often due to the change, and thus the UE may reselect the two cell in an alternate fashion. $Q_{hyst}$ is a parameter introduced to prevent two cells from being reselected in an alternate fashion by adding hysteresis to the cell reselection process.

The UE measures $R_S$ of the serving cell and $R_n$ of the neighboring cell by using Eq. 2, determines the cell having the largest ranking index as the best ranked cell, and selects the best ranked cell.

Figure 5:
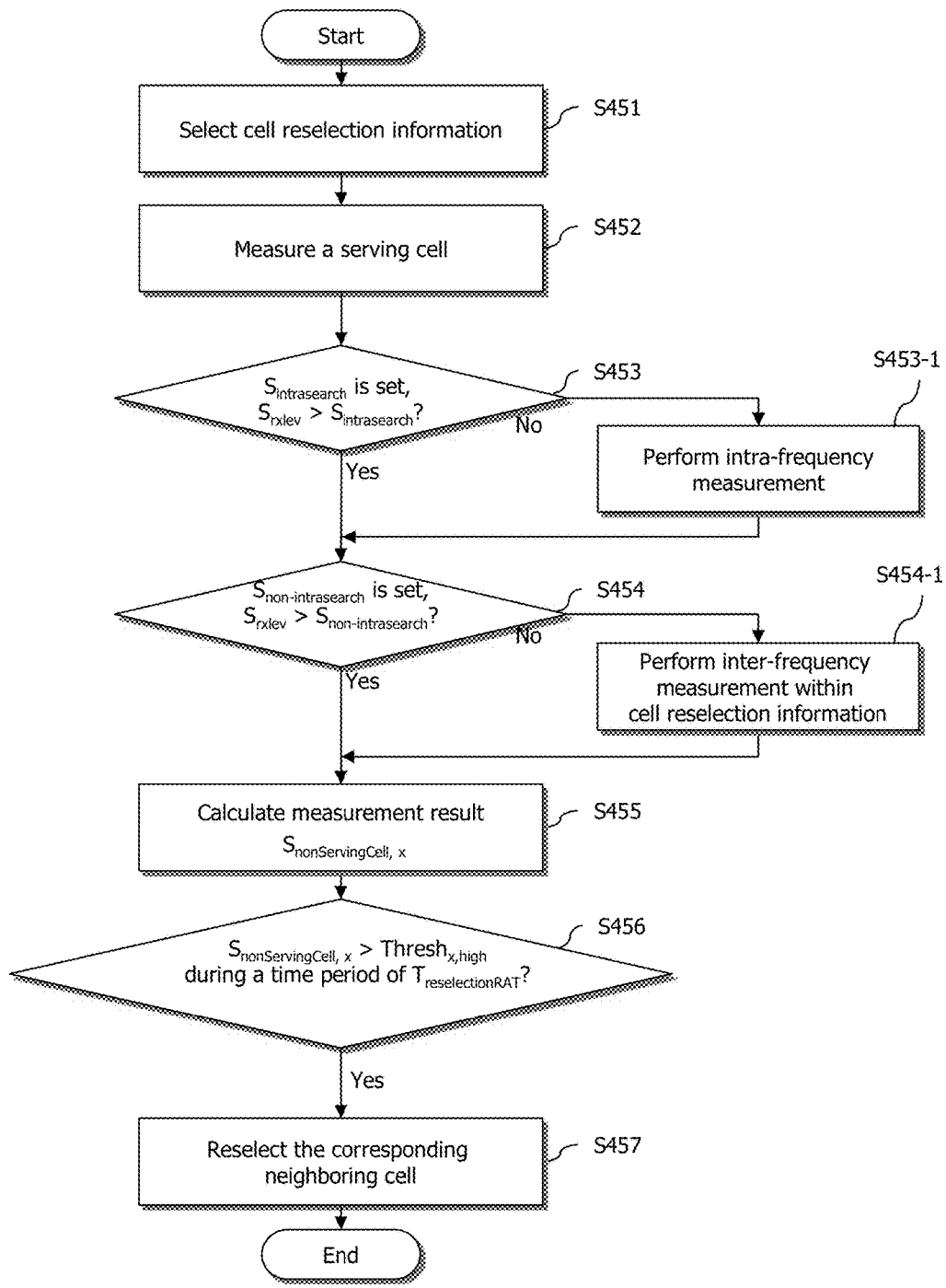
FIG. 5 is a flow diagram illustrating a cell reselection process of FIG. 4 in more detail.

FIG. 5 is a flow diagram illustrating a cell reselection process of FIG. 4 in more detail.

The UE 100 receives cell reselection information from the base station S451. Cell reselection information can include two threshold values, $S_{intrasearch}$ and $S_{non-intrasearch}$.

The UE measures the serving cell S452. The measurement result about the serving cell is expressed by $S_{rxlev}$ or $S_{qual}$ as shown in Eq. 1.

The UE compares $S_{rxlev}$ or $S_{qual}$ with $S_{intrasearch}$ S453. If $S_{rxlev}$ or $S_{qual}$ is smaller than $S_{intrasearch}$, the UE performs intra-frequency measurement S453-1. If $S_{rxlev}$ or $S_{qual}$ is larger than $S_{intrasearch}$, the UE can skip the measurement about the neighboring cell operating in the same frequency of the serving cell.

If cell reselection information does not include $S_{intrasearch}$, the UE cannot skip the measurement about the neighboring cell operating in the same frequency as that of the serving cell.

The UE compares $S_{rxlev}$ or $S_{qual}$ with $S_{non-intrasearch}$ S454. If $S_{rxlev}$ or $S_{qual}$ is smaller than $S_{non-intrasearch}$, the UE performs intra-frequency measurement S454-1. In other words, if quality of the serving cell is better than $S_{non-intrasearch}$, the UE can skip the measurement about the neighboring cell operating in the frequency different from that of the serving cell.

If cell reselection information does not include $S_{non-intrasearch}$, the UE cannot skip the measurement about the neighboring cell operating in the frequency different from that of the serving cell.

The UE 100 calculates a measurement result about the neighboring cell x, $S_{nonServingCell,x}$ S455.

Next, if $S_{nonServingCell,x}$ value of the cell x operating in the measurement frequency is larger than $Thresh_{x,high}$ during a time period denoted by $T_{reselectionRAT}$ S456, the UE 100 reselects the corresponding cell S457. $S_{nonServingCell,x}$ can correspond to $S_{rxlev}$ or $S_{qual}$ value of the cell x operating in the measurement frequency.

Figure 6:
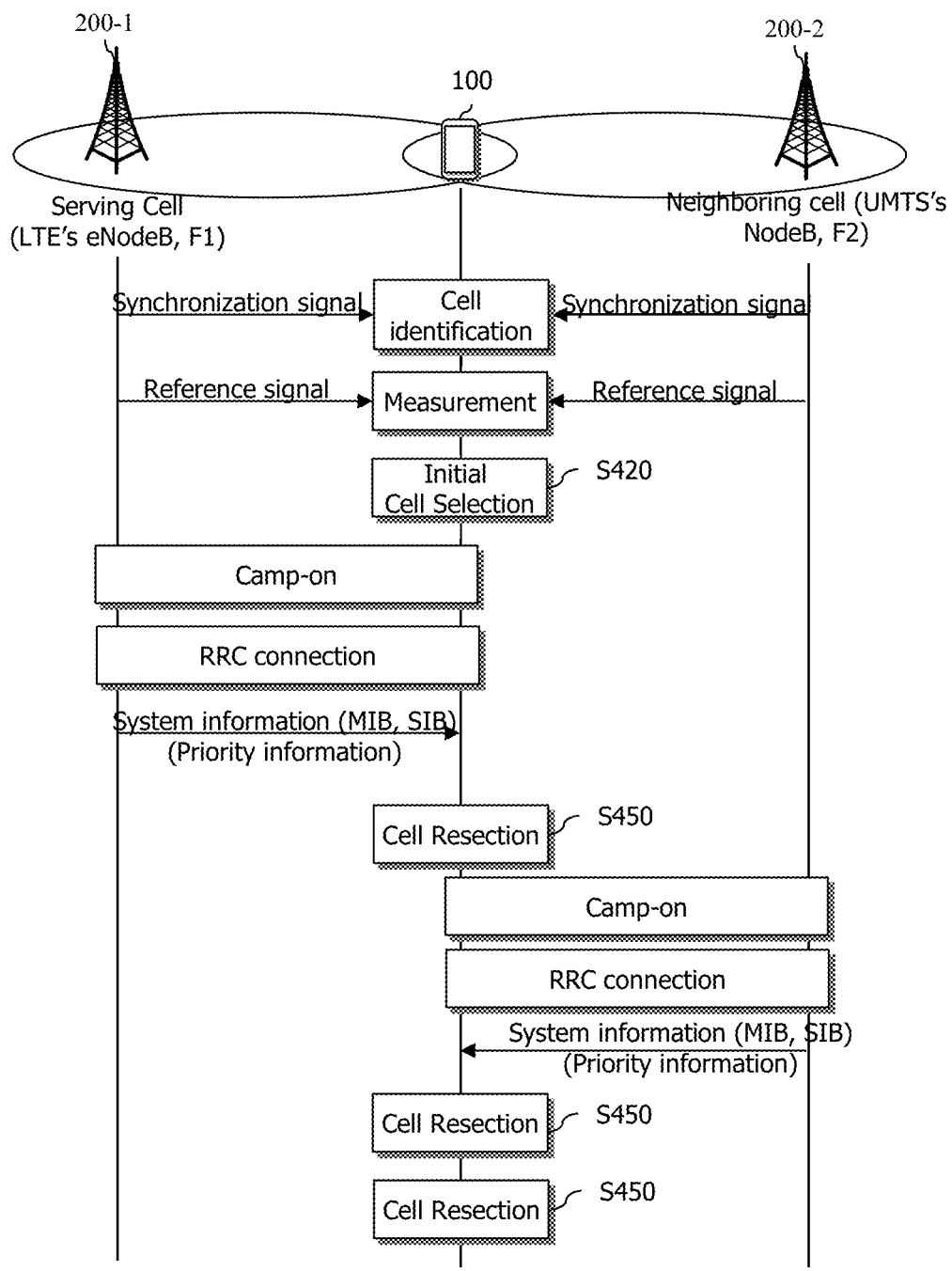
FIG. 6 is a flow diagram illustrating an inter-RAT cell reselection and an inter-frequency cell reselection process.

FIG. 6 is a flow diagram illustrating an inter-RAT cell reselection and an inter-frequency cell reselection process.

With reference to FIG. 6, the eNodeB 200-1 based on the LTE system uses frequency F1, and the NodeB 200-2 based on the UMTS uses frequency F2.

The UE 100 which has just turned on performs the initial cell selection process. First of all, the UE 100 receives a synchronization signal from the eNodeB 200-1 and the NodeB 200-2, namely, Primary Synch Signal (PSS) and Secondary Synch Signal (SSS) and identifies a cell by obtaining cell ID through the synchronization signal.

Next, the UE 100 performs cell measurement through a reference signal, for example, Cell-specific Reference Signal (CRS). To help understand the CRS, the following descriptions are given. A CRS is a reference signal shared among the UEs within a cell and is used for obtaining information about channel state and measuring handover. The UE measures Reference Signal Received Power (RSRP) and Reference Signal Received Quality (RSRQ) by using the CRS. Also, the UE can calculate feedback information such as Channel Quality Information (CQI), Precoding Matrix Indicator (PMI), and Rank Indicator (RI) through the CRS.

And the UE 100 performs the initial cell selection according to the procedure described above S420.

If the UE 100 selects the eNodeB 200-1 based on the LTE system, the UE 100 camps on the cell of the eNodeB 200-1.

Accordingly, FIG. 5 denotes the eNodeB 200-1 as a serving cell. Next, the UE 100 establishes an RRC connection and receives system information from the eNodeB 200-1, namely, Master Information Block (MIB) and System Information Block (SIB). The MIB can be received through a Physical Broadcast Channel (PBCH), and the SIB can be received through a Physical Downlink Shared Channel (PDSCH). The system information, namely, SIB can include inter-RAT priority and frequency priority.

The UE 100 performs reselecting a cell of the NodeB 200-2 according to the inter-RAT priority and frequency priority S450.

And the UE 100 camps on the cell of the NodeB 200-2 and establishes an RRC connection. And the UE 100 receives inter-RAT priority and frequency priority through system information from the cell of the NodeB 200-2.

If it is found from the inter-RAT priority and frequency priority received from the cell of the NodeB 200-2 that the eNodeB 200-1 has a higher priority, the UE 100 again reselects a cell of the eNodeB 200-1.

As described above, in case the priority provided from the eNodeB 200-1 based on the LTE system collides with the priority provided from the NodeB 200-2 based on the UMTS or the priorities are not optimized, the UE 100 suffers the ping-pong phenomenon.

To prevent the ping-pong phenomenon, the LTE allows cell reselection only after a predetermined time period is passed since a UE camps on a particular cell. However, the time period is defined as 1 second in the LTE system. Thus the ping-pong phenomenon is still remained unsolved, and the UE bounces back and forth every one second.

Also, to prevent the ping-pong phenomenon, the existing LTE system uses a hysteresis value, $Q_{hyst}$ and an offset, $Q_{offset}$ as described above. However, as described above, there are times the UE does not receive the offset value, $Q_{offset}$, and in this case, $Q_{offset}=0$; as a result, the ping-pong problem is not solved completely in the existing LTE system.

Moreover, the existing LTE system deals only with the ping-pong problem and completely fails to provide a solution to the problem that the measurement processes S453-1, S454-1, which are part of the cell reselection process S450, are repeated.

Therefore, in what follows, described will be a method according to one embodiment of the present invention to solve the aforementioned problem.

<Method According to One Embodiment of the Present Invention>

According to one embodiment of the present invention, the number of ping-pongs is reduced by changing the absolute priority in the 4G LTE/LTE-A/UMTS network. The ping-pong phenomenon is detected based on the number of reselection repeated between two specific cells.

According to the current 3GPP specifications, the absolute priority related to the cell reselection is usually invariant. In case the absolute priority is received through dedicated signaling, the absolute priority does not change until a valid timer for the absolute priority expires. However, according to one embodiment of the present invention, in the case of occurrence of the ping-pong phenomenon, the absolute priority of a neighboring cell (namely, inter-RAT priority and frequency priority) is changed.

More specifically, according to one embodiment of the present invention, the UE 100 can activate a ping-pong related timer, namely, $T_{pingpong}$ and a ping-pong related counter, namely, $N_{pingpong}$. If the number of repetitions of cell reselection between the two cells reaches the ping-pong related counter, namely, $N_{pingpong}$ before the UE 100 terminates the ping-pong related timer $T_{pingpong}$, the UE 100 can detect that ping-pong has occurred. Each time the ping-pong phenomenon is detected, the UE 100 can change the absolute priority of a frequency used for measurement and calculation related to cell reselection.

In what follows, a method for changing absolute priority of a cell according to one embodiment of the present invention will be described for the cases where two cells use the same RAT and where two cells use different RATs from each other.

First of all, described will be the case where two cells use the same RAT. For example, suppose that cell C1 and cell C2 are used, both of the cell C1 and the cell C2 use the same RAT (for example, both of them use the LTE or the UMTS system), and cell C1 is the serving cell of the UE 100. At this time, further suppose UE 100 repeats cell reselection between the cell C1 and the cell C2. Change of the absolute priority can be carried out as follows.

In case the frequency priority of the neighboring cell C2 is the same as the frequency priority of the serving cell C1, the UE 100 applies a compensation factor to the frequency priority of the neighboring cell C2. The compensation factor may be used to make the frequency priority of cell C2 lower than that of the serving cell C1. As one example, the compensation factor may take on the amount of a single increment representing the unit of frequency priority. As an alternative, the compensation factor may take on the value by which the frequency priority of the cell C2 is set to the lowest priority. Therefore, the current serving cell C1 is selected as it is taken into consideration with a higher priority than the cell C2 during the cell reselection process, and the UE does not experience the ping-pong phenomenon while the compensation factor is being applied.

In case the frequency priority of the neighboring cell C2 is lower than that of the serving cell C1, priority adjustment may not be carried out.

Next, described will be the case where two cell use different RATs from each other. For example, let's suppose that cell C1 and cell C2 are used; the cell C1 and the cell C2 use different RATs from each other (for example, one uses the LTE/LTE-A system while the other uses the UMTS system); and the cell C1 is a serving cell of the UE 100. At this time, further suppose the UE 100 repeats cell reselection between the cell C1 and the cell C2. Change of the absolute priority can be carried out as follows.

In case the serving cell C1 and the neighboring cell C2 have the same inter-RAT priority and the same frequency priority, the UE 100 assumes that the priorities of the neighboring cell C2 are lower than those of the serving cell C1. Therefore, the number of reselecting the neighboring cell C2 can be reduced.

However, in case both of the serving cell C1 and the neighboring cell C2 have an inter-RAT priority and frequency priority higher than the priorities of the serving cell C1, the UE 100 can reduce the priorities of the neighboring cell C2. If the serving cell C1 and the neighboring cell C2 have the same inter-RAT priority and the same frequency priority as the priorities are lowered, the UE 100 regards that the priorities of the neighboring cell C2 are all lower than those of the serving cell C1 as described above. In this way, as the priorities are lowered, the number of measurements can be reduced. In particular, to maximize the reduction above, the hysteresis value used for ranking, $Q_{hyst}$, can be set to a higher value. Also, to reduce the number of measurements, two threshold values, $S_{intrasearch}$ and $S_{non-intrasearch}$, can be set to higher values.

The method according to one embodiment of the present invention described above can be applied in various other forms. As an example of modification, if the number of repetitions for cell reselection carried out continuously between the two cells reaches the ping-pong related counter $N_{pingpong}$ before the ping-pong related timer $T_{pingpong}$ expires, the UE 100 may determine that the ping-pong phenomenon has occurred.

The ping-pong related counter $N_{pingpong}$ and the ping-pong related timer $T_{pingpong}$ can be delivered to the UE 100 in various ways. For example, the serving cell can deliver the two values to the UE 100 through an SIB. At this time, the SIB can be SIB3. Or the serving cell can deliver the two values to the UE 100 through RRC signaling.

In what follows, with reference to a related drawing, one embodiment of the present invention will be described.

Figure 7:
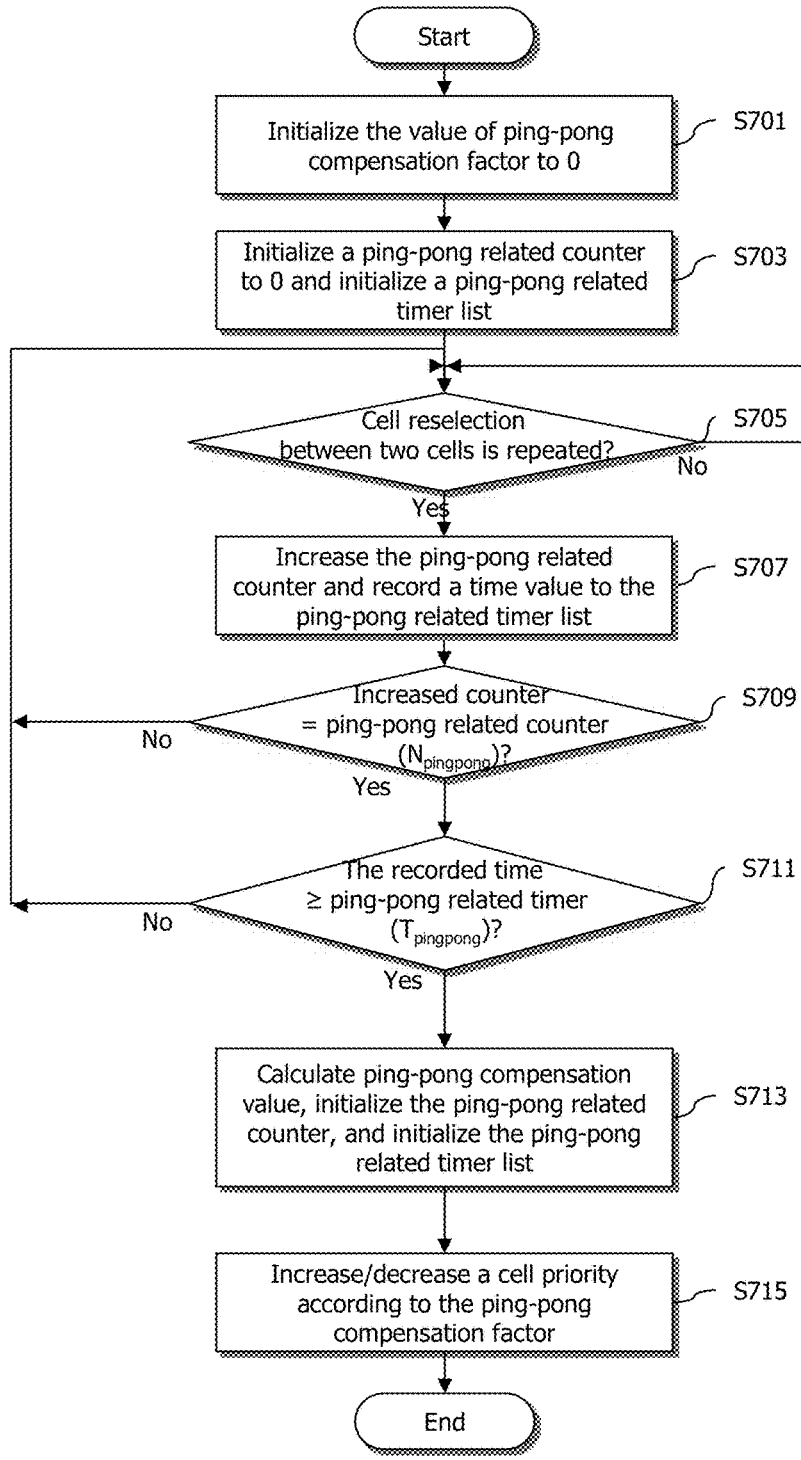
FIG. 7 is a flow diagram illustrating a method according to one embodiment of the present invention.

FIG. 7 is a flow diagram illustrating a method according to one embodiment of the present invention.

As can be known from FIG. 7, the UE 100 can initialize the ping-pong compensation factor, for example, to zero S701.

Subsequently, the UE 100 initialize the ping-pang related counter, for example, to zero and initialize the list of the ping-pong related timer S703.

Next, the UE 100 monitors whether cell reselection is repeated between two cells S705. In case cell reselection is repeated between two cells, the UE 100 increases the value of the ping-pong related counter by one step and writes a time value into the list of the ping-pong related timer S707.

Next, the UE 100 determines whether the value of the ping-pong related counter is the same as the ping-pong related counter value $N_{pingpong}$ received from the serving cell S709.

If the two values are different from each other, the UE 100 returns to the S705 step and keeps monitoring to check whether cell reselection is repeated between the two cells. Accordingly, as cell reselection is repeated, the value of the ping-pong related counter increases continuously and a time value is continuously written to the list of the ping-pong related timer.

However, if the value of the ping-pong related counter is the same as the ping-pang related counter value $N_{pingpong}$ received from the serving cell, the UE 100 determines whether time values within the list of the ping-pong related timer fall within the range of the value of the ping-pong related timer $T_{pingpong}$ received from the serving cell S711. For example, suppose the value of the ping-pong related timer $T_{pingpong}$ is 30 seconds. And further suppose the list of the ping-pong related timer is managed in the form of hh:mm:ss and 15:45:33, 15:45:44, and 15:45:51 have been written to the list. Then since the difference between the minimum time value and the maximum time value written to the list of the ping-pong related timer amounts to 18 seconds, the difference value falls within the range of 30 s, which is the value of the ping-pong related timer $T_{pingpong}$.

If the result of the determination S711 turns out to be true, the UE 100 calculates a ping-pang compensation factor and initializes the ping-pong related counter and the ping-pong related timer list S713. As an alternative, the ping-pong compensation factor may have been received from the network.

Next, the UE 100 increases/decreases cell priority according to the ping-pong compensation factor S715. Accordingly, since the increased/decreased priority value is used for calculation for cell reselection, ping-pong phenomenon can be reduced. For example, if the ping-pong compensation factor is −1 and the cell priority is an integer n, the cell priority becomes n−1. In another example, if the ping-pong compensation factor is a very large negative number and the cell priority is an integer n, the cell priority is changed to the lowest priority. In this case, the UE 100 can increase/ decrease the cell priority according to the ping-pong compensation factor only for a predetermined time period, for example, while the timer $T_{\_adjustment}$ is operating. Therefore, if the timer $T_{\_adjustment}$ expires, the UE 100 can withdraw applying the compensation factor and withdraw increasing/decreasing the priority.

Meanwhile, if the result of the determination S711 turns out to be false, the UE 100 returns to the S705 step and keeps monitoring to check whether cell reselection is repeated between two cells. Accordingly, as cell reselection is repeated, the value of the ping-pong related counter increases continuously and a time value is continuously written to the list of the ping-pong related timer.

Alternatively, if the result of the determination S711 turns out to be false, the UE 100 may not return to the S705 step but decrease the value of the ping-pong related counter. Also, the UE 100 can delete the time value recorded earliest in the list of the ping-pong related timer.

The UE 100 decreases the value of the ping-pong related counter and initializes the previous timer and the ping-pong related timer list S713.

Figure 8:
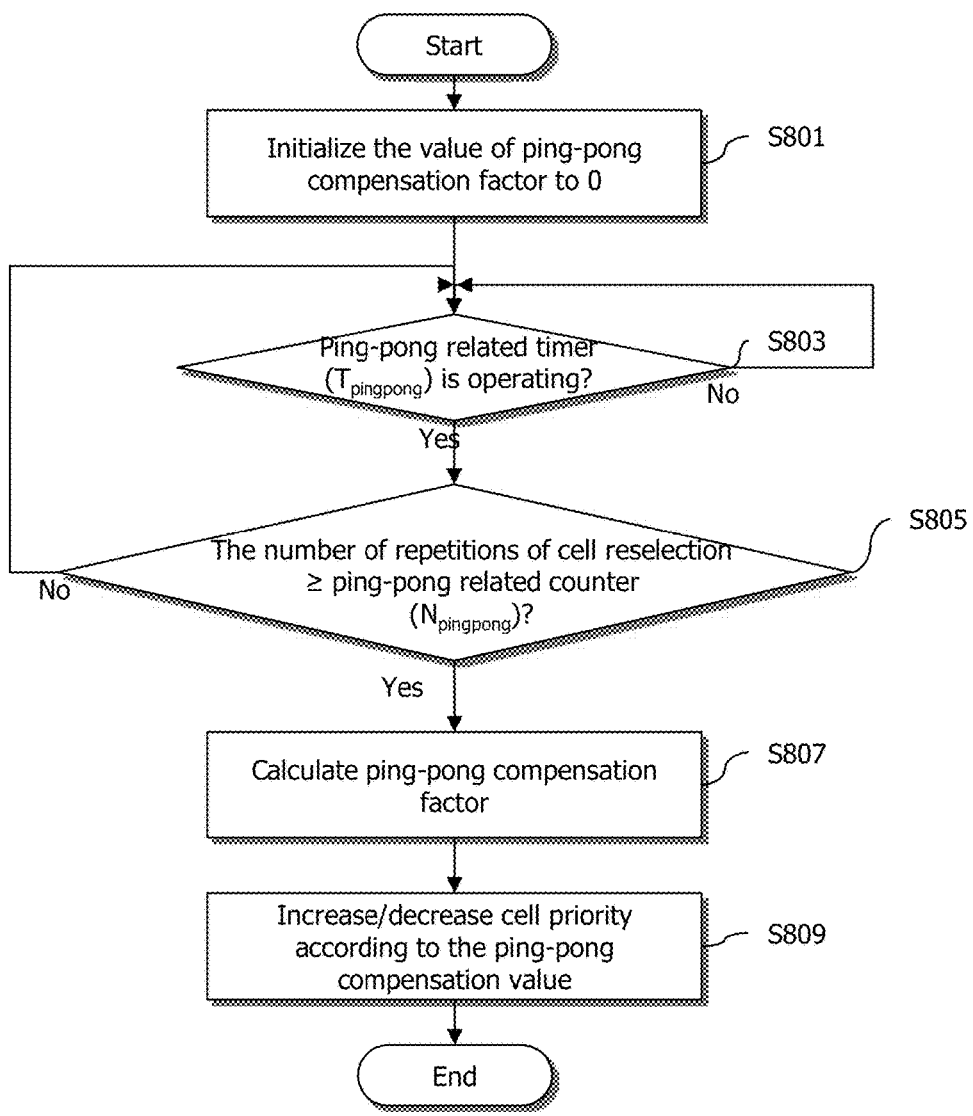
FIG. 8 is a simplified example of the method according to one embodiment of the present invention of FIG. 7.

FIG. 8 is a simplified example of the method according to one embodiment of the present invention of FIG. 7.

As shown in FIG. 8, the UE 100 can initialize the ping-pong compensation factor, for example, to zero S801.

Next, before the ping-pong related timer $T_{pingpong}$ expires after repetition of cell reselection between the two cells is first observed and the ping-pong related timer is initiated S803, the UE 100 can determine whether the number of repetitions of cell reselection between the two cells reaches the ping-pong related counter, namely, $N_{pingpong}$ S805.

If the S803 determination step and the S805 determination step all turn out to be true, the UE 100 can recognize that the ping-pong phenomenon has occurred and calculate a ping-pong compensation factor S807.

The UE 100 increase/decrease the cell priority according to the ping-pong compensation factor S809. Accordingly, since the increased/decreased priority value is used for calculation for cell reselection, ping-pong phenomenon can be reduced.

Figure 9:
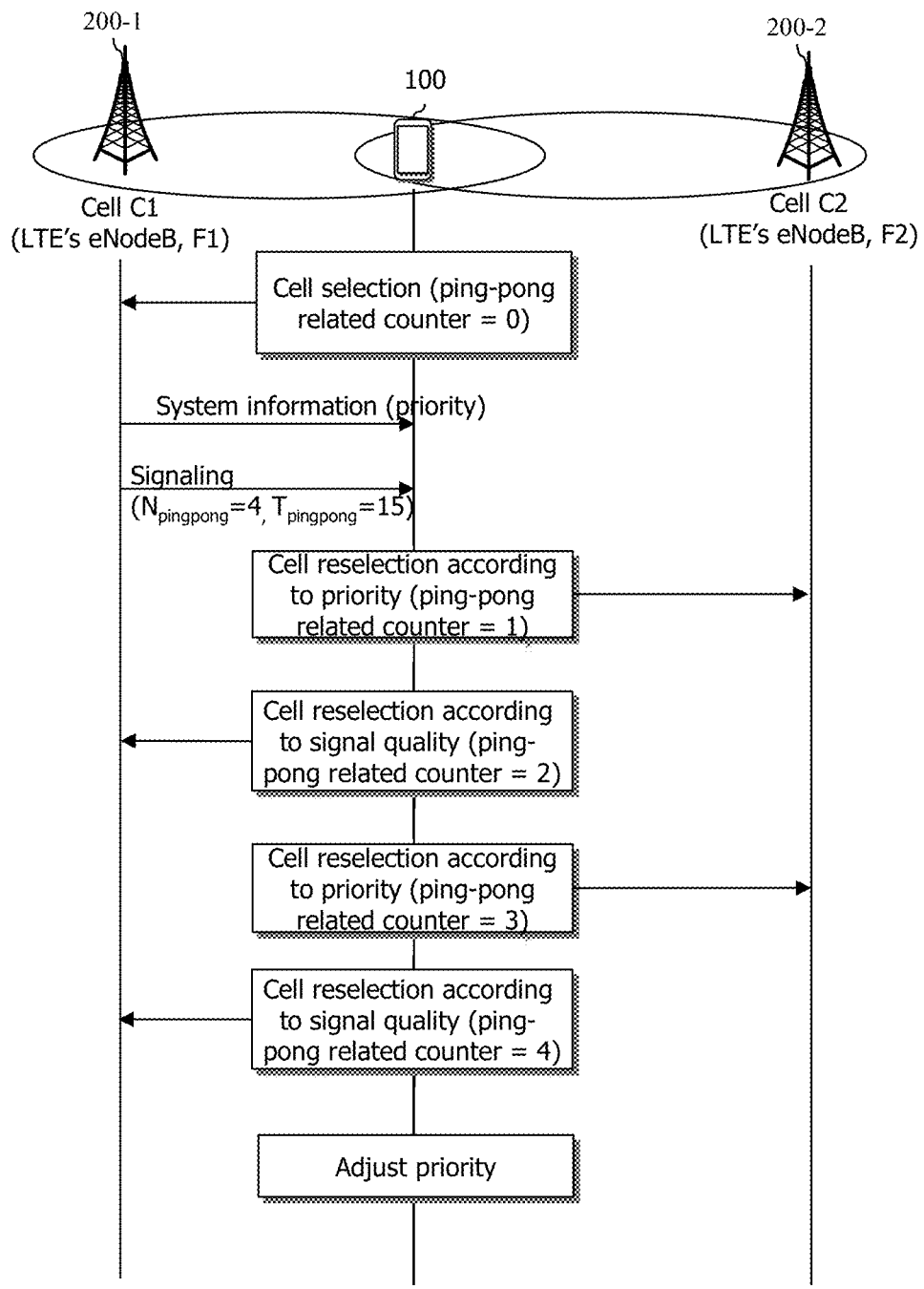
FIG. 9 illustrates an example to which a method according to one embodiment of the present invention is applied.

FIG. 9 illustrates an example to which a method according to one embodiment of the present invention is applied.

With reference to FIG. 9, cell C1 of the eNodeB 200-1 based on the LTE system uses frequency F1, while cell C2 of the eNodeB 200-2 based on the LTE system uses frequency F2. At this time, it is assumed that the UE 100 is located closer to the cell C1 than to the cell C2 and signal quality of the cell C1 is better than that of the cell C2. Therefore, it is assumed that the cell C2 is selected by the UE 100 as a serving cell.

The UE 100 receives system information from the serving cell C1. The system information includes inter-RAT priority and inter-frequency priority.

Also, the UE 100 receives signaling from the serving cell C1. The signaling includes a ping-pong related counter $N_{pingpong}$ and a ping-pong related timer $T_{pingpong}$. For example, the value of the ping-pong related counter $N_{pingpong}$ can be 4, and the value of the ping-pong related timer $T_{pingpong}$ can be 15 seconds.

Now suppose that LTE>UMTS according to the inter-RAT priority and F1<F2 according to the inter-frequency priority.

Since both of the serving cell C1 and the neighboring cell C2 use the same RAT, which is the LTE system, the UE 100 reselects the neighboring cell C2 which operates at frequency F2 according to the intra-frequency priority and increases the value of the ping-pong related counter by 1.

If it is found from the measurement by the UE 100 that $S_{nonServingCell,x}$ value of the cell C1 operating at frequency F1 is larger than $Thresh_{x,high}$ value during the time period of $T_{reselectionRAT}$, the UE 100 reselects the cell C1 again and increases the value of the ping-pong related counter to 2.

Again, the UE 100 reselects the neighboring cell C2 operating at frequency F2 according to the intra-frequency priority and increases the value of the ping-pong related counter to 3. However, if the $S_{nonServingCell,x}$ value of the cell C1 is still larger than $Thresh_{x,high}$ value during the time period of $T_{reselectionRAT}$, the UE 100 reselects the cell C1 again and increases the value of the ping-pong related counter to 4.

In this way, in case the value of the counter becomes identical to the value of the ping-pong related counter $N_{pingpong}$, 4 within the value of the ping-pong related timer $T_{pingpong}$, which is 15 seconds, the UE 100 can decrease the priority of the cell C2.

The embodiments illustrated above may be implemented by various instruments. For example, the embodiments of the present invention may be implemented by hardware, firmware, software, or combinations thereof, which will be described in detail with reference to FIG. 10.

Figure 10:
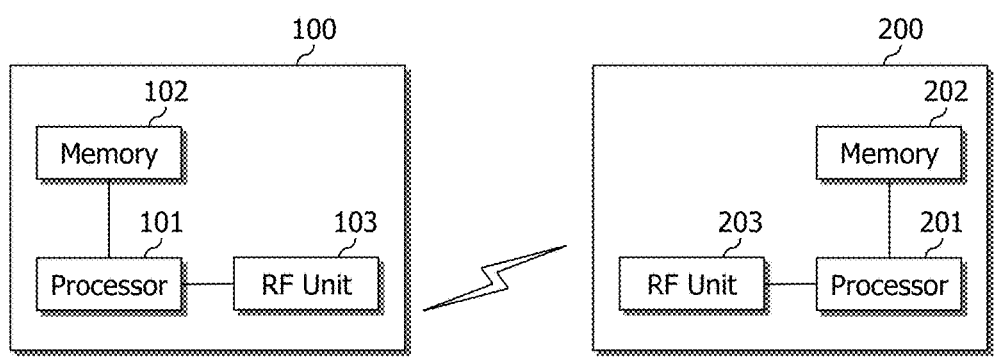
FIG. 10 is a block diagram illustrating a wireless communication system according to an embodiment of the present invention.

FIG. 10 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A cell reselection method, comprising
receiving information about a ping-pong detection criterion;
determining whether a ping-pong phenomenon has occurred due to repetition of cell reselection between a first cell and a second cell based on the information about the ping-pong detection criterion; and
adjusting priority of one of the cells according to a result of the determining,
wherein if a priority of the second cell corresponding to a neighboring cell is higher than a priority of the first cell corresponding to a serving cell, the adjusting priority comprises applying a compensation factor to the priority of the second cell corresponding to the neighboring cell.

2. The method of claim 1, further comprising receiving information about priorities of the first cell and the second cell.

3. The method of claim 2, wherein the information about the ping-pong detection criterion includes information about a ping-pong related timer and a ping-pong related counter.

4. The method of claim 3, wherein the determining whether the ping-pong phenomenon has occurred comprises:
activating the ping-pong related timer; and
determining according to the information about priorities whether the number of repetitions of cell reselection between the first cell and the second cell reaches a value of the ping-pong related counter before the ping-pong related timer expires.

5. The method of claim 2, wherein the information about priorities includes information about inter-Radio Access Technology (inter-RAT) priority and inter-frequency priority.

6. The method of claim 3, wherein the information about the ping-pong related timer and the ping-pong related counter is received through Radio Resource Control (RRC) signaling or system information.

7. The method of claim 1, wherein the compensation factor takes on a value identical to a difference between the priority of the first cell and the priority of the second cell.

8. The method of claim 2, wherein the adjusting priority decreases the priority of the second cell corresponding to the neighboring cell by one step in case it is found from the received information about priorities that the priority of the second cell corresponding to the neighboring cell is higher than that of the first cell corresponding to the serving cell.

9. The method of claim 2, wherein the adjusting priority decreases the priority of the second cell corresponding to the neighboring cell by one step in case it is found from the received information about priorities that the priority of the first cell corresponding to the serving cell is the same as that of the second cell corresponding to the neighboring cell.

10. A user equipment (UE) for carrying out cell reselection, the UE comprising:
a Radio Frequency (RF) unit configured to receive information about a ping-pong detection criterion; and
a processor configured to:
determine whether a ping-pong phenomenon has occurred due to repetition of cell reselection between a first cell and a second cell based on the information about the ping-pong detection criterion, and
adjust priority of one of the cells according to a result of the determining,
wherein if a priority of the second cell corresponding to a neighboring cell is higher than a priority of the first cell corresponding to a serving cell, the priority is adjusted by applying a compensation factor to the priority of the second cell corresponding to the neighboring cell.

11. The UE of claim 10, wherein the RF unit is further configured to receive information about priorities of the first cell and the second cell.

12. The UE of claim 10, wherein the information about the ping-pong detection criterion includes information about a ping-pong related timer and a ping-pong related counter.

13. The UE of claim 11, wherein the information about priorities includes information about inter-Radio Access Technology (inter-RAT) priority and inter-frequency priority.

14. The UE of claim 12, wherein the information about the ping-pong related timer and the ping-pong related counter is received through Radio Resource Control (RRC) signaling or system information.

15. The UE of claim 11, wherein the compensation factor takes on a value identical to a difference between the priority of the first cell and the priority of the second cell.

16. The UE of claim 11, wherein, to adjust the priority, the processor is further configured to decrease the priority of the second cell corresponding to the neighboring cell by one step in case it is found from the received information about priorities that the priority of the second cell corresponding to the neighboring cell is higher than that of the first cell corresponding to the serving cell.

17. The UE of claim 11, wherein, to adjust the priority, the processor is further configured to decrease the priority of the second cell corresponding to the neighboring cell by one step in case it is found from the received information about priorities that the priority of the first cell corresponding to the serving cell is the same as that of the second cell corresponding to the neighboring cell.

* * * * *